(12) United States Patent
Bond et al.

(10) Patent No.: US 6,539,348 B1
(45) Date of Patent: Mar. 25, 2003

(54) SYSTEMS AND METHODS FOR PARSING A NATURAL LANGUAGE SENTENCE

(75) Inventors: Douglas G. Bond, Weston, MA (US); Churl Oh, Wellesley, MA (US)

(73) Assignee: Virtual Research Associates, Inc., Weston, MA (US)

( * ) Notice: Subject to any disclaimer, the term of this patent is extended or adjusted under 35 U.S.C. 154(b) by 0 days.

(21) Appl. No.: 09/379,668

(22) Filed: Aug. 24, 1999

Related U.S. Application Data

(60) Provisional application No. 60/097,643, filed on Aug. 24, 1998.

(51) Int. Cl.$^7$ .............................................. G06F 17/27
(52) U.S. Cl. .......................................................... 704/9
(58) Field of Search .................... 704/1, 9, 10; 707/530, 707/531

(56) References Cited

U.S. PATENT DOCUMENTS

| | | | |
|---|---|---|---|
| 4,864,501 A | 9/1989 | Kucera et al. | 364/419 |
| 4,868,750 A | 9/1989 | Kucera et al. | 364/419 |
| 4,991,094 A | 2/1991 | Fagan et al. | 364/419 |
| 5,890,103 A | 3/1999 | Carus | 704/9 |

FOREIGN PATENT DOCUMENTS

| | | |
|---|---|---|
| EP | 0 413 132 A2 | 2/1991 |
| WO | WO 97/04405 | 2/1997 |

*Primary Examiner*—Patrick N. Edouard
(74) *Attorney, Agent, or Firm*—Foley Hoag LLP

(57) ABSTRACT

A method, computer program product, and apparatus for parsing a sentence which includes tokenizing the words of the sentence and putting them through an iterative inductive processor. The processor has access to at least a first and second set of rules. The rules narrow the possible syntactic interpretations for the words in the sentence. After exhausting application of the first set of rules, the program moves to the second set of rules. The program reiterates back and forth between the sets of rules until no further reductions in the syntactic interpretation can be made. Thereafter, deductive token merging is performed if needed.

23 Claims, 1 Drawing Sheet

SYSTEMS AND METHODS FOR PARSING A NATURAL LANGUAGE SENTENCE

This application claims priority from U.S. Provisional Application No. 60/097,643 filed Aug. 24, 1998.

BACKGROUND OF THE INVENTION

The present invention is directed to a natural language sentence parser.

Natural language processing is hindered by the inability of machines to recognize the function of words as they appear in their context. The context for the words are the sentences in which they are framed. The functions of a word are indicated by the word's syntax.

The task is complicated by the fact that words can be used in several parts of speech. For instance, the word "fine" could be a noun, a verb, an adjective, or an adverb. The single most important task in the machine parsing of natural language is to be able to identify which part of speech a word is being used as. One of the most complicating factors in resolving parts of speech of words in English is that many nouns can also be verbs. The articles, adjectives, and possessive pronouns are very important cues to resolve this problem, as illustrated in the case of "a fine vase." Since the word fine follows an article, a rule can be established and applied in which fine cannot be a verb or an adverb. Once that rule has been applied, the phrase "a fine vase" can be merged into a noun phrase regardless of whether the word "fine" is a noun or an adjective.

The ability to use a computer to determine the appropriate syntax for sentences permits computers to participate in analysis of enormous amounts of information such as news reports from around the world. Analysis of such large data bases can be useful in plotting trends in terms of a general understanding of, for example, violence or political unrest in various parts of the world. Alternatively, analysis may be conducted to plot news trends and how they relate to various stock market performance indices. Numerous such analyses are possible but in order to obtain meaningful interpretation from any such analysis, the system must be able to parse sentences in the raw data.

A news analyzer would begin with a filter formatter which identifies the beginning and end of a sentence. The filter formatter needs to distinguish between periods that are found in the middle of a sentence and those which are found at the end of a sentence. Each sentence may then be provided to a parser for determining the syntax of the Each sentence may then be provided to a parser for determining the syntax of the sentence. With the syntax of the sentence automatically determined, it then becomes possible to identify the action or verb set forth in the sentence, the subject of the sentence and the object of the action. The parsed sentence is then provided to an events generator arranged in accordance with the particular news analysis desired. The events generator would look for particular words of interest to the particular analysis being performed. In conjunction with the parsing of the sentence, the import of the various words can be better determined and more properly characterized in the final analysis. Events of import can be counted and associated with categories such as areas of the world. Such counted information can then be displayed or analyzed in chart or report format. The reliability of the analysis can be significantly enhanced by providing a parser that reliably identifies the proper syntax of the sentence.

SUMMARY OF THE INVENTION

In accordance with the method of an embodiment of the invention, words in a sentence are tokenized whereby a list of syntactic identifiers corresponding to the word are indicated. Syntactic identifiers encompasses parts of speech as well as other indicators of word usage. The tokens comprised of the list of syntactic identifiers are used consecutively and compared with a first list of rules in order to produce a narrower set of possible syntactic interpretations of the words of the sentence. Syntactic identifiers in the token may be deleted or replaced by identifiers covering a smaller class of words. This token merging step is repeated until no further changes can be determined for the sentence at that level of rules. Using the narrower set of possible interpretations, token merging proceeds by matching the current set of tokens against a second list of rules. Further reduction in the number of syntactic interpretations is made possible. The first level token merging and second level token merging are reiterated until no further reductions in the syntax of the sentence can be made.

Another embodiment may include the step of matching consecutive words in a sentence with multiple words in a dictionary. If the dictionary contains possible syntactic identifiers for the consecutive words used in conjunction, then a token for the matched multiple words is substituted for the tokens of each of the individual words. A still further embodiment follows up on the method with deductive token merging. When several rules in a given list are matches for a sentence, in accordance with an embodiment of the invention, a longer of the applicable rules is applied.

The rules may include substitution rules which retain the number of tokens but substitute or delete syntactic identifiers therein and concatenation rules which eliminate tokens. If both a substitution and a concatenation rule may be applied to a series of tokens, then the substitution rule is preferred and applied. The deductive token merging, may include referring to a polysemy count to determine a most frequently preferred part of speech for a particular word in a sentence.

A further embodiment of the invention is directed to a computer program product in which computer readable program code is present on a computer usable medium. The code includes a tokenizing code, first inductive merging program code which applies a first set of rules to consecutive tokens from an input sentence, a second inductive merging program code which applies a second set of rules to the narrower set of syntactic interpretations obtained from the first inductive merging program code and reiteration program code for cycling through the first and second inductive merging program codes until no further reductions in the syntactic interpretations are possible. The program code may further include multi-word matching program code.

A further embodiment of the invention is directed to a sentence parser having a tokenization module, a replaceable set of first substitution and concatenation rules, a replaceable set of second substitution and concatenation rules and an iterative inductive processor for reducing the syntactic possibilities for a sentence in accordance with matching against the rules. The parser may further include a multi-word comparator.

The replaceable rules sets used in embodiments of the invention advantageously permit customizing of the parsing in accordance with any given user's needs. Further advantages of the invention will become apparent during the following description of the presently preferred embodiment of embodiments of the invention taken in conjunction with the drawings.

DETAILED DESCRIPTION OF THE PREFERRED EMBODIMENTS

Figure 1:
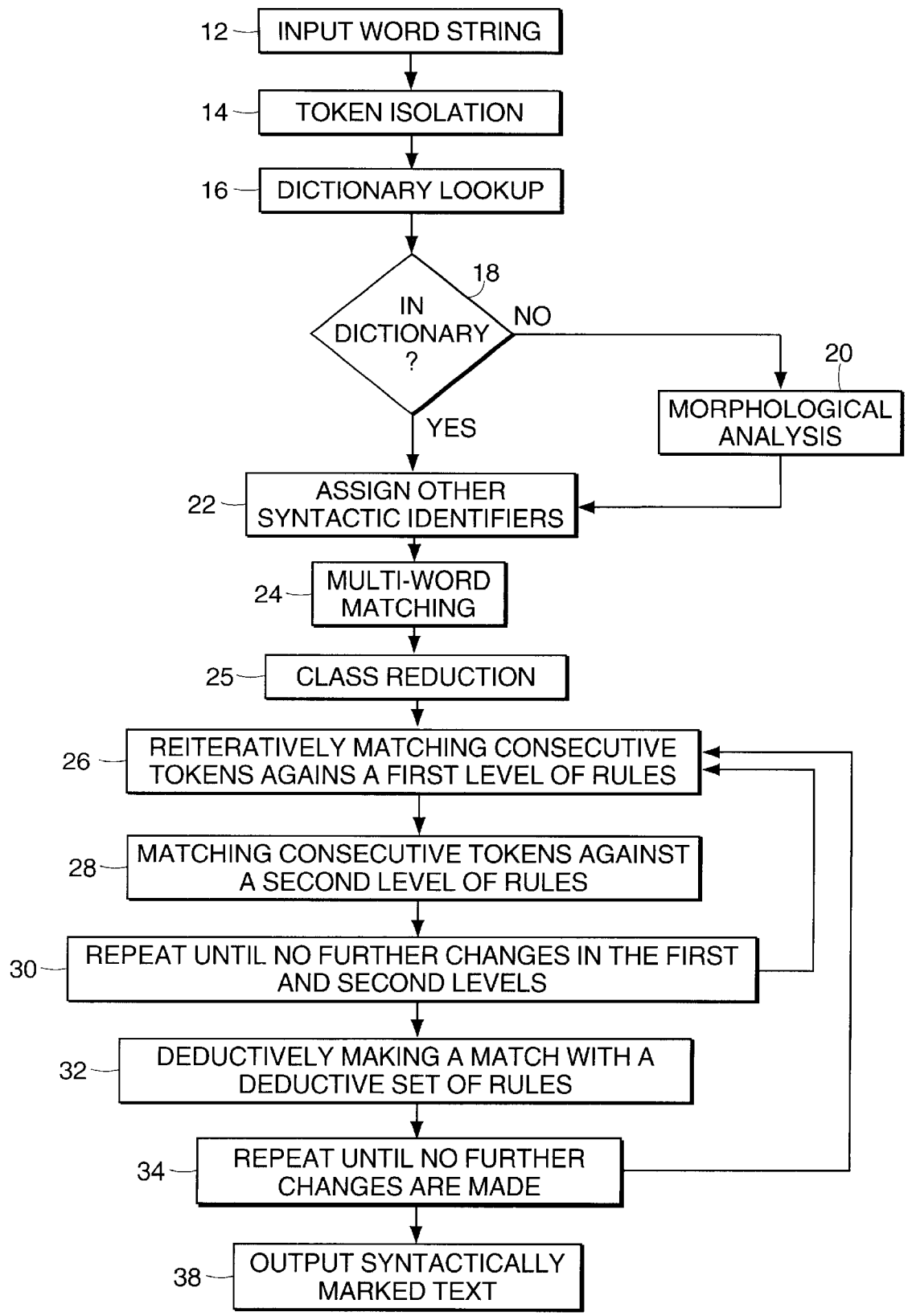
FIG. 1 is a flow chart of an embodiment of the invention.

Referring now to FIG. 1, an embodiment of the invention comprised of a method performed in a data processing system such as a computer will be described. The process begins by receiving a word string 12. The word string may be electronically provided as a series of characters. The input string may have been stored electronically, read with an optical character reader from a textual image, input through a keyboard or provided by any other suitable means. A filter/formatter of a conventional type is used to analyze a continuous word string and determine the beginnings and ends of sentences. Such a filter/formatter would need, at a minimum, to distinguish between periods that are found inside a sentence from those which are found at the end of a sentence. The beginnings and ends of sentence are marked. The method of FIG. 1 acts upon a sentence. The sentence goes through the process of token isolation 14 on the data processing system. Token isolation is a known process for identifying individual words and grammatical markings. Each word or grammatical marking is assigned a token. The process of word isolation 14 includes expanding contractions, correcting common misspellings and removing hyphens that were merely included to split a word at the end of a line. Each word and grammatical marking becomes the subject of a dictionary look-up process 16. The dictionary look-up 16 tags each token with all of its eligible parts of speech. Parts of speech are one type of syntactic identifier discussed herein. It has been found that the WordNet Dictionary available from Princeton University is suitable as a dictionary for the look-up process. The WordNet Dictionary may be supplemented to improve its performance in a user's particular application depending upon the subject area and type of writing that is being analyzed. Supplementation may include an additional listing of words and their associated parts of speech as well as a list of exceptions which may provide parts of speech different from and to be substituted for those found in the WordNet Dictionary. Certain applications may find the interpretations listed in the WordNet dictionary to be inappropriate, therefore the exceptions can be helpful. If a word cannot be found 18 in the dictionary or the supplement, morphological analysis 20 may be useful to transform a word into a word that is present on the dictionary. Morphological analysis includes such commonly known tasks as removing suffixes from a word such as -ed, -ing, -s or changing -ied to "y". The revised word can then be used in a dictionary look-up 22 to identify the parts of speech for listing with the token for the word. Further analysis may include marking an unknown word that is in all capitals as an acronym, a subclass of noun. An unknown word with initial capital only can be marked as a proper noun. An unknown hyphenated word may be given a token with noun and adjective as the possible parts of speech. If all else fails, the word can be marked as an unknown. The dictionary or supplement can be continually updated to include results established for unknowns through morphological analysis.

After identifying parts of speech for a word, additional syntactic identifiers may be assigned 22. These may include attributes of a word such as tense of a verb, e.g., past or present. Attributes of the original word can be maintained that would otherwise be lost after the morphological analysis reduced the word to its base. Such characteristics determined by suffixes as tense or plural or singular may be tracked as an attribute. Subject matter analysis of the sentence after parsing can be enhanced by including semantically useful information in the attributes for example, such information may indicate whether a word indicates hostile conduct or friendly conduct, or whether a word indicates a negation. Negatives can be tracked and toggled to help keep track of multiple negatives in a sentence. This is useful in interpreting whether an action happened or did not happen when automatically processing the subject matter of a sentence. Modality such as foreshadowing, obligation, imperatives and possibility may be useful to the subject matter analysis. The general structure of the syntactic identifiers provides great flexibility in terms of using data processing to analyze vast amounts of sentence inputs.

Once all of the tokens have their list of syntactic identifiers, it can be helpful in parsing a sentence to perform multi-word matching 24. For all words that are not articles, such as "the" or "a", consecutive words are matched against the dictionary to learn if any matches can be found. If a match such as "United States" is found, the tokens for each of the words can be replaced by a token for the multiple words which lists syntactic identifiers relative to the multiple word combination found in the dictionary. According to the presently preferred embodiment, the WordNet dictionary and a supplemental dictionary is used without the WordNet verb dictionary in the multi-word matching step. Restricting the multi-word matching so as to exclude verbs has been found to be more efficient. Multi-word verbs are often separated in ways that make automatic concatenation difficult until later on in the parsing process.

Sentence parsing can be made more efficient by concentrating on a reduced number of different syntactic identifiers in the analysis. While a dictionary may provide a variety of subclasses of parts of speech, it has been found that parsing may be completed on the basis of the major parts of speech classes. In order to rely upon a reduced set of syntactic identifiers, the tokens are put through a step of class reduction 25. All of the syntactic text markings obtained from the dictionaries are integrated into a class inheritance system whereby each class is related to its respective subclasses. As an example, the subclass "number" is designated as either a "noun" or an adjective. Appendix A gives a table of class inheritances that may be applied in accordance with a present embodiment. The first column lists the different syntactic identifiers produced by the dictionaries. The second column lists identifiers from a select set of syntactic identifiers. Syntactic identifiers from the select set are added to the token for any identifier not in the select set. The designation (****) means that the identifier in the first column is already in the select set. A new identifier from the select set supplements an identifier that is in a sub-class of the new identifier.

The class reduction code 25, thus, provides identifiers from the select set for each token. This constitutes a simple yet powerful reduction technique that narrows the number of syntactic possibilities right at the start. The syntactic identifiers in a rule can concentrate on those classes permitted by the select set of identifiers.

The series of tokens are provided to an iterative inductive token merging processor, i.e., a computer programmed with iterative inductive merging code. This code operates in conjunction with a set of rules. While the rules may be built into the inductive processor it is preferable and advantageous to provide a replaceable database that contains the rules to be applied. In this manner, rules can be easily added, deleted or modified. A different set of rules may be better in one application such as speech from a set of rules more suitable to newspaper text. A rule includes a set of conditions which if met, will indicate a particular result which has the affect of narrowing the possible syntactic interpretations of the sentence. The set of conditions is determined by a series of elements. Each element is matched against at least one of the tokens in the sentence. In accordance with a preferred embodiment, the sequence of elements is split into three consecutive sectors. A sector of elements that is subject to transformation by the rule, is preceded by a first sector of elements and followed by a third sector of elements. The first and third sectors are optional and will not be necessary in all rules. If the elements in the three sectors of the rule match the series of consecutive tokens in the sentence being analyzed then the transformation dictated by the rule is performed. The original tokens are transformed in accordance with the instructions of the result.

The rules can be divided into two types of rules. There are substitution rules which take the original tokens and substitute the same number of tokens but with syntactic identifiers that are narrower in scope constituting only a subset of the original syntactic possibilities. Another type of rule is referred to as a concatenation rule in which the result of the rule reduces the number of tokens.

A first set of rules typically operates at the phrase level of a sentence. In addition to eliminating syntactic possibilities, there are rules in this set which can identify verb phrases or noun phrases, for example. The iterative inductive processor in accordance with the preferred embodiment matches consecutive tokens 26 from the sentence against the first set of rules. As long as rules are being matched the processor will continue to reiterate through the sentence making more matches. Each application of a rule narrows the syntactic possibilities. When no further changes can be made by the processor using the first set of rules, the processor performs matching consecutive tokens 28 in the resulting narrower set of possible interpretations against a second set of rules. The second set of rules typically includes rules that can identify a syntactic sequence that fits the definition of a clause. Again, the process uses the second set of rules until no further narrowing of the possible syntactic interpretations are possible. The process proceeds into reiteration program code 30 which returns the processing to the matching with respect to the first set of rules. Again, processing continues until no further changes can be made and then processing continues to the second level. This continues until neither the first set of rules nor the second set of rules can make any further reductions in the syntactic interpretations. While it would be highly desirable to have the sentence fully resolved at the completion of the iterative inductive processing, at times this will not be the case. Some sentences are ambiguous on their face and necessarily resist parsing. Other sentences simply evade the standard conventions which are captured by the rules. Sentences that cannot be fully parsed through the inductive token merging program may be useful in suggesting additional rules for the first or second set that may make the inductive processing code more robust. While the present embodiment employs two sets of rules for inductive token merging, it is contemplated that embodiments of the invention could be implemented by those of ordinary skill in the art so as to include three or more sets of rules.

So as not to leave a sentence incompletely parsed, the syntactic possibilities are passed on to deductive token merging code. The deductive code reviews possible sentence types and determines which ones are possible given the syntactic possibilities that remain following the inductive merging process. When more than one sentence is possible, the deductive token merger identifies a token that still has a plurality of possible syntactic identifiers unresolved. The code will return to the dictionary to identify the syntactic identifier most commonly used for the subject word. The WordNet dictionary, for example, provides a polysemy count which gives a numerical determination of which syntactic identifier is the most commonly used for a given word. The syntactic identifier most commonly used for the word is kept and any others are deleted. Once the change has been made limiting an unresolved token to a particular syntactic identifier, the narrowed set of syntactic possibilities are sent back to the inductive merger processor 34 to try to complete the sentence parsing. Processing proceeds in this matter until the sentence has been parsed into syntactic identifiers that fall within an acceptable sentence structure. The syntactically marked text is output 36 to permit further analysis. The syntactically marked text output from the parsing module is retained in a software "object" that may be accessed via object linking and embedding (OLE) automation. The user is thus offered direct access to the syntax parse tree without the need for custom programming. This approach supports flexible user access to the syntax parse independent of any semantic information such as happens in noun and verb classes and event forms.

Rules for resolving parts of speech can grow to be extremely numerous. The rules may change depending on the type of input sources, such as news reports or speech. For that reason, it is undesirable to incorporate rules into the program code itself. By providing the rules in a separate replaceable data base and specifying the rules in a consistent manner, the rules can be stored externally, and added or modified as needed.

In accordance with a further embodiment of the invention, sentence parsing and subject matter analysis can be enhanced by making use of the variety of syntactic identifiers. To distinguish for the computer between the additional attributes and those of the parts of speech, a presently preferred embodiment creates the parts of speech syntactic identifiers between angle brackets whereas the attributes are between straight brackets. The syntactic identifiers for a particular token are listed consecutively. A space is inserted between consecutive tokens to delimit the beginning and end of each token. A space is sometimes indicated in the appendices as an underscore.

Iterative processing through a plurality of sets of rules is very helpful in dealing with parsing of a sentence that includes a multiplicity of clauses. Such sentences that include numerous combinations of nouns and verbs are very difficult to parse for the conventional parser. The iterative inductive token merging fully exhausting a first level of rules that deal with phrases before going on to the second level of rules which is directed more towards clauses is helpful in separately parsing the clauses prior to obtaining a parse that satisfies the entire sentence.

Dynamic attributes is a further enhanced type of syntactic identifier that assists in breaking up the parsing into smaller parts to fully resolve each of the clauses before going on to a higher level. This is a type of attribute that is assigned in accordance with rules such as given in the example of Appendix B. Once the tokens have been determined from the class reduction step, the dynamic attribute rules can be applied to the tokens. For tokens that match a rule, a dynamic attribute may be added as shown in the rule. If more than one rule is satisfied by a token, both will be applied and the token may receive more than one dynamic attribute. Dynamic attributes are typically used to signify that a word would be expected to begin and end a phrase and, in the case of adverbs, that they can generally be skipped with respect to the beginning or ending of a phrase. The various types of dynamic attributes are signified by the initials B, E or S in the embodiment of Appendix B. A dynamic attribute is also given a number. As used herein, the number 1 is the broadest class, 2 is a subset of 1 and 3 is a subset of 2. The dynamic attributes can be revised after each token merging narrowing of syntactic possibilities. The dynamic attributes are useful components that may be incorporated as elements of rules, in accordance with an enhanced embodiment of this invention. If a dynamic attribute is used as an element of a rule, it will be matched by the same attribute or one with a higher number. A dynamic attribute can be used to avoid merging tokens prematurely. For instance, without dynamic attributes the phrase "a student" in "formed a student group in the school" can be prematurely merged into a noun phrase. By marking the word "in" and the word "formed" as dynamic attributes indicative of the beginning and ending of a phrase, merger can easily be accomplished for the entire phrase "a student group" despite that the word "group" may be a verb or a noun.

A sample first set of rules is shown in Appendix C and a sample second set of rules is shown in Appendix D. The particular sets of rules that are employed will often depend upon the language being analyzed and the source of the sentences being analyzed. It is contemplated that a user will modify the rules to better operate in the environment in which they are being used. The condition for each of the rules shows a bunch of elements that have been separated into three sectors. The before portion provides a condition for the token or tokens appearing before the tokens to be transformed. The after elements are used to correspond with the token or tokens appearing after the tokens to be transformed. The column labeled "original" indicates the elements that are to be matched against the tokens to be transformed. The various elements are separated by a space or underscore to indicate that each element is to be applied to a separate token.

Various symbols are useful in expressing the conditions of a rule. For the rules shown in the appendices the following conventions have been adopted. Of course, other symbols and different symbol interpretations may be adopted for use with embodiments of the invention. Symbols are used to provide greater flexibility in writing rules so that each listing of identifiers does not require an exact one-to-one match. The symbol "*" is a wild card that permits any number of different additional syntactical identifiers to be included in the token in addition to that one which has been specifically named. The symbol "+" indicates that the named element may be present zero or more times for the token to match. Thus, an element with a + may be compared with the tokens in the sentence but need not find a match as long as the remaining sequence of elements provides a suitable match with the consecutive tokens in the sentence. If the conditions of the elements in the three sectors are satisfied, the result set forth in the transformed sector will be performed on the tokens corresponding to the original elements. After any change caused by a rule, the dynamic attribute rules can be applied to the result to, in effect, update the appropriate dynamic attributes for that portion of the sentence.

In the enhanced embodiment of the invention, the transformation caused by a rule can operate upon the attributes, removing attributes or saving particular attributes. This is shown in the transformation portion of the rules and is indicated by a number in brackets. The number [0] refers to the first element in the original sequence; the number [1] applies to the second element; and the number [2] refers to the third element in the original sequence. The rule will cause the preservation of the attributes designated by the numbers in brackets. A minus sign is used in the rule results to indicate that a particular syntactic identifier that follows the minus sign is to be removed from the list of syntactic identifiers in the particular token. A colon is used to refer to semantic meaning. A colon followed by a number indicates that the meaning corresponding to the transformed token is that of the word corresponding to the token that corresponds to the numbered element.

As a general matter, sentences will be analyzed sequentially comparing each token in sequence with the set of rules to see if any apply. There are occasional times when applying the tokens to a set of rules that more than one rule will apply to the tokens under consideration. The dynamic attribute rules will apply any and all that apply. The inductive token merging code, on the other hand, will determine which single rule to apply first. In a preferred embodiment, preference is given to a substitution rule over a concatenation rule. A substitution rule will narrow the syntactic possibilities by more narrowly defining a particular token. The number of tokens will remain the same after application of the substitution rule. A concatenation rule, on the other hand, will reduce the number of tokens. If more than one substitution rule or more than one concatenation rule is applicable to the sentence, preference is given to the rule that has a longer list of elements including those in the before sector, the after sector and the original sector. If there is still a tie between two or more rules, the first one in the set of rules will be used. Only rules that produce a narrowing transformation to the syntactic possibilities need be considered.

It may be helpful to an understanding of the embodiment described herein to provide an example. Let us analyze the example sentence: "He could not possibly have been doing this." The sentence is input into the sentence parser. The beginning and end of the sentence are marked appropriately substituting for the period. In the tokenization module each of the individual words is isolated and looked up in the dictionary. The syntactic identifiers go through class reduction. The tokens including syntactic identifiers for parts of speech, attributes and dynamic attributes, for each of the words is shown below in Table 1.

TABLE 1

```
<BEGIN> [@#3E]
he <PRON>[SUBJ] [@#1E] [@#1B]
    could <AUXI> <VERB>[POSS][PAST] [@#1E]:can
    not <ADVB> [!NEG] [@#1S]
    possibly <ADVB>[POSS] [@#1S]
    have <VERB> [BASE][PRES] [@#1E][@#1B]:have
been <VBPP> [PASS]:be
doing <VBPG> [@#1E]:do
this <PRON> [OBJE][SUB]{ @#1E][@#1B]
<END>     [@#3B]
```

The parser internally tracks the semantic meanings of words with their base form. Inflections are indicated in the list of attributes. The tokens are passed to the inductive merging code for matching with the first set of rules. The first rule in the first set of rules shown in Appendix C to match the consecutive tokens in the sentence is <AUXI>(*)_[@#1S](+)_<VERB>[BASE]. The plus after the dynamic attribute [@#1S] indicates that it can be satisfied by matching with zero, 1 or more tokens having that dynamic attribute. The results of the rule calls for <VERB>[PHRA][0][1]:2. The [0] calls for the attribute found in the token matching with the first element of the rule. The attributes for the tokens corresponding to the second element are also called for. An exclamation point is used in the indicator "!NEG" to indicate that it toggles on and off when combined with another such negative indicator. A sentence with a double negative can thus be interpreted positively. The :2 determines that the meaning of the verb phrase is determined by the meaning of the token corresponding to the third element of the rule. In this case, the meaning "have" is thus determined. The dynamic attributes are also calculated at this time applying the [@#1E] and [@#1B] to the verb token. Table 2 shows the tokens after this rule has been applied.

TABLE 2

<BEGIN> [@#3E]
he   <PRON>[SUBJ][@#1E][@#1B]
    could not possibly have
<VERB>[PHRA][POSS][PAST][!NEG][@#1E][@#1B]:have
    been <VBPP>[PASS]:be
doing <VBPG>[@#1E]:do
this <PRON> [OBJE][SUB]{ @#1E][@#1B]
<END> [@#3B]

The processing continues with the first set of rules. The <VERB>(*):have_[@#1S](+)_<VBPP>(*) rule is the next one that applies. This rule in Appendix C stipulates that any form of the verb "have" followed by zero, one or more optional first level skipping words and a verb past participle is transformed into a verb phrase of perfect tense with attributes of the first and second matches and with a meaning of the third match. Table 3 shows the tokens after this rule has been applied.

TABLE 3

<BEGIN> [@#3E]
he   <PRON>[SUBJ][@#1E][@#1B]
could not possibly have been
<VERB>[PHRA][PERF][POSS][PAST][!NEG][@#1E][@#1B]:be
doing <VBPG>[@#1E]:do
this   <PRON>[OBJE][SUBJ][@#1E][@#1B]
<END>    [@#3B]

The processor continues through the first level of rules. It is found that the rule<VERB>(*):be_[@#1S](+)_<VBPG> (*) can now be applied to the narrowed syntactic possibilities that have thus far been generated for the sentence by the inductive merging code. The original tokens that apply to the conditions of the rule are transformed according to the rule outcome <VERB>[PHRA][PROG][0][1]:2. PROG stands for progressive tense. The result is given below in Table 4.

TABLE 4

<BEGIN> [@#3E]
he   <PRON>[SUBJ][@#1E][@#1B]
could not possibly have been doing
<VERB>[PHRA][PROG][PERF][POSS][PAST][!NEG]
[@#1E][@ @#1B]:do
this   <PRON>[OBJE][SUBJ][@#1E][@#1B]
<END>    [@#3B]

Note that after these three concatenations only the second pronoun "this" remains indeterminate. The processor has not yet determined whether "this" is an object or subject. At this stage in the processing, the rule with original elements <PROP>[SUBJ][OBJE](*) preceded by <PRON>[SUBJ]_ <VERB> an followed by [@#2B] can be applied.; The #2 in the dynamic attribute element requires a dynamic attribute of at least level 2. This rule identifies the second pronoun with its objective case. This rule transforms the original tokens into the syntactic possibilities shown in Table 5.

TABLE 5

<BEGIN>  [@#3E]
he   <PRON>[SUBJ][@#1E][@#1B]
could not possibly have been doing
<VERB>[PHRA][PROG][PERF][POSS][PAST]
[!NEG][@#1E][@ @#1B]:do
this <PRON>[OBJE] [@#1E] [@#1B]
<END>[@#3B]

No further reduction from the first set of rules is possible. Processing continues now into the second set of rules. In the second set of rules, the sequence pronoun-verb-pronoun is transformed into a clause. The frame begin-clause-end is transformed into a sentence. Thus the parsing is now complete. Each and every word in the sentence is now associated with its full grammatical context or syntax structure. The embodiment demonstrates a dynamic procedure that operates in a hierarchical and iterative manner to resolve sentences more efficiently than either an inductive or deductive approach alone. The deductive approach when needed, fills in as a last resort to complement the iterative inductive process to achieve efficient parsing.

In accordance with an embodiment of the invention, the disclosed method for natural language parsing may be implemented as a computer program product for use with a computer system. Such implementation may include a series of computer instructions fixed either on a tangible medium, such as a computer-readable medium (e.g., a diskette, CD-ROM, ROM, or fixed disk), or transmittable to a computer system, via a modem or other interface device, such as a communications adapter connected to a network over a communication link. The communication link may be either a tangible link (e.g., optical or wire communication lines) or a communication link implemented with wireless techniques (e.g., microwave, infrared or other transmission techniques). The series of computer instructions embodies all or a part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical, or other memory devices, and may be transmitted using a communications technology, such as optical, infrared, microwave, or other transmission technologies. It is expected that such computer program product may be available as a removable medium with accompanying printed or electronic documentation (e.g., shrink-wrapped software) preloaded with a computer system (e.g., a system ROM or fixed disk), or distributed from a server or electronic bulletin board over the network (e.g., the Internet or World Wide Web).

Of course, it should be understood that various other changes and modification to the preferred embodiments described above will be apparent to those skilled in the art. For example, the number of sets of rules may be increased beyond two and the particular syntactic identifiers that are used in the program may vary according to the needs of a particular application. These and other changes can be made without departing from the spirit and scope of the invention and without diminishing its attendant advantages. It is therefore intended that such changes and modifications be covered by the following claims.

APPENDIX A

Sample Listing of Syntactic Identifiers

| Identifier | Set | Description |
|---|---|---|
| <VERB> | <****> | VERB |
| <VBPP> | <****> | "Verb, Participial, Passive" |
| <VBPG> | <****> | "Verb, Participial, proGressive" |
| <PRON> | <****> | PRONoun |
| <NNAD> | <NOUN> | "NouN, possibly Adverbial" |
| <NNAD> | <ADVB> | "NouN, possibly Adverbial" |
| <PTAD> | <PREP> | "ParTicle, Adverbial" |
| <PTAD> | <ADVB> | "ParTicle, Adverbial" |
| <NUMB> | <NOUN> | NUMBer |
| <NUMB> | <ADJE> | NUMBer |
| <DIAC> | <****> | DIACriticals |
| <PREP> | <****> | PREPosition |
| <ADVB> | <****> | ADVerB |
| <AUXI> | <VERB> | AUXIliary verb |
| <ADJE> | <****> | ADJEctive |
| <NOUN> | <****> | NOUN |
| <VBPP> | <ADJE> | VerB Past Participle is an ADJEctive |

APPENDIX B

Sample Listing of Level 0 Rules

| Before | Original | After | Transformed |
|---|---|---|---|
| | <VBPG> | <ARTC> | [@#1E] |
| | <PRON> | | [@#1B] |
| | <PRON> | | [@#1E] |
| | <PHPT> | | [@#1B] |
| | <PREP> (*) | | [@#1B] |
| | <PREP> (*) | | [@#1E] |
| | <DIAC> | | [@#1B] |
| | <DIAC> | | [@#1E] |
| | <VERB> | | [@#1E] |
| | <ADVB> | | [@#1S] |
| | <BEGN> | | [@#3E] |
| | <END_> | | [@#3B] |
| | <VERB> | | [@#1B] |
| | <PTAD> | | [@#1B] |
| | <PTAD> | | [@#1E] |
| | <ARTC> | | [@#1B] |
| | <PRPS> | | [@#1B] |
| | <CONJ> | | [@#2B] |
| | <CONJ> | | [@#2E] |
| | <ADVB> [DAYS] | | [@#1B] |
| | <ADVB> [DAYS] | | [@#1E] |
| | <VBPP> | | [@#1B] |
| | <VBPP> | | [@#1E] |
| | <NRST> | | [@#1S] |
| | <LIST> (*) | | [@#1B] |
| | <LIST> (*) | | [@#1E] |
| | <VBIN> | | [@#1B] |
| | <VBIN> | | [@#1E] |
| | <CLAU> | | [@#2B] |
| | <CLAU> | | [@#2E] |
| | <VBPG> | <ARTC> | [@#1B] |

APPENDIX C

Sample Listing of Level 1 Rules

| Before | Original | After | Transformed |
|---|---|---|---|
| | <PRON> [SUBJ] (*) | <VERB> (*) | <PRON> [0] |
| | <VERB><NOUN> [PRES] (*) | <VERB> | <NOUN> [0] |
| | <VERB> (*) :have_ [@#1S] (+)_ <VBPP> (*) | | <VERB> [PHRA] [PERF] [0] [1]:2 |
| | <VERB> (*) :be_ [@#1S] (+)_ | | <VERB> [PHRA] [FORS] [0] [1]:4 |

APPENDIX C-continued

Sample Listing of Level 1 Rules

| Before | Original | After | Transformed |
|---|---|---|---|
| | going_to_<VERB> [BASE] (*) | | |
| | <VERB> (*) :be_ [@#1S] (+)_ <VBPP> (*) | | <VERB> [PHRA] [0] [1] [PASS]:2 |
| | <NOUN> (*)_'s | | <ADJE> |
| | <VERB> (*) :be_ [@#1S] (+)_ <VBPG> (*) | | <VERB> [PHRA] [PROG] [0] [1]:2 |
| [@#1E] | <ADJE> (+)_ <NOUN>_ | [@#1B] | <NOUN> [PHRA] [0] [1] [2] |
| | <NOUN> (+) | | |
| <ARTC>_ <ADVB> (+) | <ADVB> (*) | <ADJE> | <ADVB> [0] |
| <LIST> (*+)_ <ARTC>_ <NOUN> <ADJE> <ADVB> (+)_ <NOUN> [SNGL] ( | <NOUN><VERB> [PRES] (*) | | <NOUN> [0] |
| | <AUXI> (*)_ [@#1S] (+)_ <VERB> [BASE] (*) | | <VERB>[PHRA] [0] [1]:2 |
| | <LIST> (*) <END_> | !<VERB>_ | <LIST> [0] <ADVB> [1]:1 |
| | on_<NNAD> [DAYS] | | |
| | <NOUN> [PHRA]_ of_<NOUN> (*) | [@#1B] | <NOUN> [0] |
| <PRON> [SUBJ] | <VERB> (*) | | <VERB> [0] |
| | <ARTC>_<ADVB> (+)_<ADJE> (+)_ <NOUN> ! [PHRA] (1) | [@#1B] | <NOUN> [PHRA] [3] |
| <ARTC>_ <ADVB> (+) (*)_ <ADJE> (+) | <ADJE> (*) | <NOUN> | <ADJE> [0] |
| <VERB> [@#1E] | <VERB><NOUN> (*) <NUMB> (*)_ <ADVB> (*+)_ <ADJE> (*+)_ <NOUN> | [@#2B] [@#1B] | <0> [0]- <VERB> <NOUN> [PHRA] [1] [2] |
| | <PTAD> (*) | <ADVB> [TIME] | <ADVB> [0] |
| | <ARTC>_<ADVB> <ADJE> (+)_ <ADJE> (+)_ <NOUN> | [@#1B] | <NOUN> [PHRA] |
| <VERB> [@#-2E]_ ! <LIST> (*+)_ <NOUN> [SNGL] [@#1E] | <NNAD> <NOUN><VERB> [BASE] (*) | [@#2B] <VERB> (*) | <ADVB> [0] <0> [0] & <NOUN> |
| | <NOUN>_<LIST>_ <NOUN> | [@#1B] | <NOUN> [CMPD] [0] [2] - [SNGL] <NOUN> [0] |
| <ADJE> <ARTC>_ <ADVB> (*+)_ <ADJE> (*+) [@#1E] | <VERB> [PRES] (*) <UNKN> | <VERB> | <NOUN> <VERB> <NOUN> |
| | <NOUN><ADJE>_ <NOUN>_<NOUN> (+) | [@#2B] | <NOUN> [PHRA] [0] [1] [2] |
| <PRPS> | <NOUN><VERB> (*) <PRPS>_<ADVB> (*+) ! <VERB> ! | [@#1B] | <0> - <VERB> [0] <NOUN> [PHRA] [3] |

APPENDIX C-continued

Sample Listing of Level 1 Rules

| Before | Original | After | Transformed |
|---|---|---|---|
|  | [@#1B]_<ADJE> (*+) ! <VERB>! [@#1B]_<NOUN> |  |  |
|  | <VBPG><NOUN> (*) | <PRON> [OBJE] | <VBPG> [0] |
|  | <ARTC>_<NOUN> <ADVB> <ADJE> (+)_ <NOUN> <ADJE> (+)_ <NOUN>_ <NOUN> (+) | [@#1B] | <NOUN> [PHRA] |
| [@#1E] | <NOUN> | <ADJE> | <ADJE> [0] |
| [@#1E] | <UNKN> | [@#1B] | <NOUN> |
| <ARTC> | <VBPG> |  | <ADJE> |
| <PRON> [SUBJ]_ <VERB> | <PRON> [SUBJ] [OBJE] (*) | [@#2B] | <PRON> [OBJE] |
|  | <VERB> [BASE] [@V01] ! [@V03] (*) | <NOUN> | <0> - <VERB> [0] |
| <VERB> | to_<VERB> [BASE] : (_(*+)_;) | ! <LIST> (*) | <VBIN>:1 <NRST> |
|  | <ARTC>_! <VERB> ! [@#1B] ! [@#1E] (*+) | [@#1B] | <NOUN> [PHRA] [1] |
| [@#3E] | <VERB> (*) | ! <VERB> (*+)_ [@#3B] | <VERB> [0] |
|  | "_(*+)_" |  | <NOUN> [PHRA] [QUOT] [0] |
| <ADJE> | <VBPP> (*) |  | <ADJE> [0] |
|  | <VBPP> [@V03] ! [@V01] ! [@V08] (*) | <PREP> (*) | <VBPP> [0] |
| [@#1E] | <NOUN> <ADJE> (+)_ <NOUN> ! [PHRA] (+) <NNAD> (*) | [@#1B] <NOUN> ! <VERB> (*) | <NOUN> [PHRA] [0] [1] <ADVB> [0] |
| <VERB> | <CONJ> [CORR] (*) <CONJ> [CORR] (*) <VBIN>_<LIST> (*) :and_<VERB> [BASE] (*) | <VERB> | <CONJ> [0] <CONJ> [0] <VBIN> |
|  | <VERB>:want_ <VBIN> |  | <VERB> [POSS] [0]:1 |
| to | <VERB> [BASE]_ <LIST> (*) <VERB> <BASE> |  | <VERB> [0] [2] |
| <VERB> | <VERB><NOUN> (*) <PRON> [OBJE] [SUBJ] | <VERB> | <NOUN> [0] <PRON> [SUBJ] |
|  | <VERB><VBPP> [@V01] ! [@V03] |  | <VERB> [0] |
| <NOUN> | <VERB><VBPP> (*) | <ADVB> [TIME] | <VERB> [0] |
|  | <VERB><VBPP> [@V03] (*) | by | <VBPP> |
|  | <VERB> (*) | <PRON> [OBJE] | <VERB> [0] |
|  | <CONJ><LIST> (*) | <VERB> | <CONJ> [0] |
| <ADVB> [TIME] | <VERB> (*) |  | <VERB> [0] |
|  | <NOUN> [UNKN]_ <NOUN> [UNKN] |  | <NOUN> [UNKN] |
| <ARTC> [@#3-E]_ (*+)_._ (*+) | <NOUN><ADJE> (*) <VERB> [@V08] (*) | [@#1B] [@#1S] (+)_ [@#3B] | <NOUN> [0] <VERB> [0] |
| <ARTC>_ <ADJE> <ADVB> | <VERB><NOUN> (*) |  | <0> - <VERB> [0] |
| <ARTC> | <VBPP> |  | <ADJE> |

| Before | Original | After | Transformed |
|---|---|---|---|
| <ARTC>_ <NOUN> (+) | <NOUN><ADJE> | [@#1B] | <NOUN> [0] |
| <PRPS> | <ADVB><ADJE> (*) | <NOUN>_ [@#1B] | <0> - <ADVB> [0] |
|  | <VERB><VBPP> (*) ! [@V04] | <ARTC> | <VERB> [0] |
| [@#3E]_ <NOUN> | <LIST> (*) |  | <LIST> [0] |
| between_ between (*+) | and (*+) | <LIST> | <LIST> [0] <NOUN> [PHRA] [0] |
| <NOUN> ! <VERB> (*) | <NNAD> (*) |  | <ADVB> [0] |
| <ARTC> | <VERB> (*) |  | <0> - <VERB> [0] |

APPENDIX D

Sample Listing of Level 2 Rules

| Before | Original | After | Transformed |
|---|---|---|---|
| <NOUN> [PHRA] | <NOUN><VERB> (*) <PREP> (*)_ <NOUN>_ <NOUN> (+) | <NOUN> [PHRA] [@#1B] | <VERB> [0] <PHPT> |
| [@#2E] | <NOUN> [PHRA]_ <VERB>_<NOUN> [PHRA]_<PHPR> (+) | [@#2B] | <CLAU> |
| [@#3E] | <PRON>_<VERB>_ <NOUN> | [@#3B] | <CLAU> |
| [@#3E] | <NOUN>_<VERB>_ <ADVB> | [@#3B] | <CLAU> |
| [@#3E] | <PRON> [SUBJ]_ <VERB>_<VBIN> <NOUN> | [@#3B] | <CLAU> |
| <NOUN> | to_<VERB> [BASE] (*) | <NOUN> | <VBIN>:1 |
| <CONJ> | <PRON> [SUBJ]_ <VERB> | [@#2B] | <CLAU> |
| [@#2E] | <PRON> [SUBJ]_ <VERB>_<VBIN>_ <PRON> [OBJE] | [@#2B] | <CLAU> |
| [@#2E] | <NOUN>_<VERB>_ <NOUN><ADJE> <ADVB> | [@#2B] | <CLAU> |
| [@#3E] | <PRON> [SUBJ]_ <VERB> | [@#3B] | <CLAU> |
| [@#3E] | <PRON> [SUBJ]_ <VERB>_<PRON> [OBJE] | [@#3B] | <CLAU> |
|  | <PREP> (*)_ <NOUN> | [@#2B] | <PHPT> |
| [@#3E] | <NOUN>_<VERB> (*)_<PHPR> | [@#3B] | <CLAU> |
| <VBIN> | <NOUN>_<PHPR> | [@#2B] | <NOUN> [0] |
| [@#2E] | <PRON> [SUBJ]_ <VERB>_<NOUN>_ <PHPT> | [@#2B] | <CLAU> |
| [@#2-E]_ <NOUN> | <VERB> (*) | <NOUN>_ [@#2b] | <VERB> [0] |
| [@#3E] | <NOUN>_[@#18] (+)_<VERB>_ <NOUN> <PHPT> | [@#3B] | <CLAU> |
| [@#2E] [@#3E]_ <NOUN> (*)_(*+) | <NOUN>_<VERB> _! <CONJ>_ ! <LIST> (+)_ | [@#2B] ! <LIST> (*) | <CLAU> <NRST> |
| [@#3E]_ | <VERB><VBPP> (*) |  | <0> - <VERB> [0] |

APPENDIX D-continued

Sample Listing of Level 2 Rules

| Before | Original | After | Transformed |
|---|---|---|---|
| (*+)_ <VERB> ! [@V08]_ ! <CONJ> (*+) [@#2E] | | | |
| | <NOUN>_<VERB>_ <PHPT> | [@#2B] | <CLAU> |
| | <PRON> [SUBJ] [RELA] [INTR] <VERB> | [@#2B] | <CLAU> [SBOR] |
| | <CONJ> [ADVB]_ <PRON> [SUBJ] <VERB> <NOUN> | [@#2B] | <CLAU> [SBOR] |

We claim:

1. A method for parsing a sentence having a series of words and punctuation marks comprising:
    (a) identifying for each of the words a token comprised of a list of syntactic identifiers corresponding to the word;
    (b) token merging consecutive tokens by matching consecutive tokens against a first list of rules to produce a narrower set of possible syntactic interpretations;
    (c) continuing step (b) until no further changes are determined for the syntactic identifiers; and
    (d) token merging the narrower set of possible interpretations by matching the narrower set of possible interpretations against a second list of rules to map the narrower set of possible interpretations into a parse for the sentence having a still narrower set of possible interpretations;
    wherein the second set of rules comprises substitution and concatenation rules specific to a collection of tokens.

2. The method of claim 1 further comprising:
    (e) reiterating steps b–d until no further token merging is possible.

3. The method of claim 2 further comprising deductive token merging upon completion of said step of reiterating.

4. The method of claim 3 wherein said step of deductive token merging includes reducing the list of syntactic identifiers for a word by selecting a syntactic identifier most commonly used for the word.

5. The method of claim 1 wherein the first set of rules comprises substitution and concatenation rules and wherein substitution is preferred over concatenation when both may be applied to a series of tokens in the step of token merging consecutive tokens.

6. The method of claim 1 wherein substitution is preferred over concatenation when both may be applied to a collection of tokens in the step of token merging possible interpretations.

7. The method of claim 1 wherein the first set of rules comprises substitution and concatenation rules and a rule includes a condition comprised of a series of elements, each element being for comparison with at least one token, and wherein when more than one rule resulting in substitution applies in the step of token merging consecutive tokens, an applicable substitution rule having a longer list of elements is applied.

8. The method of claim 1 wherein the first set of rules comprises substitution and concatenation rules and a rule includes a condition comprised of a series of elements, each element being for comparison with at least one token, and wherein when more than one rule resulting in substitution applies in the step of token merging the narrower set of possible interpretations, an applicable substitution rule having a longer list of elements is applied.

9. The method of claim 1 wherein the first set of rules comprises substitution and concatenation rules and a rule includes a condition comprised of a series of elements, each element being for comparison with at least one token, and wherein when more than one rule resulting in concatenation applies in the step of token merging consecutive tokens, an applicable concatenation rule having a longer list of elements is applied.

10. The method of claim 1 wherein the first set of rules comprises substitution and concatenation rules and a rule includes a condition comprised of a series of elements, each element being for comparison with at least one token, and wherein when more than one rule resulting in concatenation applies in the step of token merging the narrower set of possible interpretations, an applicable concatenation rule having a longer list of elements is applied.

11. The method of claim 1 wherein the step of identifying comprises looking up a word in a dictionary, identifying the syntactic identifiers associated with the word and providing a syntactic identifier from a given set of syntactic identifiers for any syntactic identifier that is not in the given set of syntactic identifiers and is in a subclass of the substitute syntactic identifier.

12. The method of claim 1 further comprising matching consecutive words in the sentence with multiple words in a dictionary that contains syntactic identifiers for the multiple words and substituting a token comprised of the syntactic identifiers corresponding to a matched multiple word for the tokens of each word of the consecutive words that matched.

13. A computer program product for use on a computer system for parsing sentences, the computer program product comprising a computer usable medium having computer readable program code thereon, the computer readable program comprising:
    tokenizing program code that provides tokens, each comprised of a list of syntactic identifiers, for the works of a sentence;
    first inductive merging program code applying a first set of rules to consecutive tokens in a sentence processed by said tokenizing program code to produce a narrower set of syntactic interpretations; and
    second inductive merging program code applying a second set of rules comprising substitution and concatenation rules specific to a collection of tokens to the narrower set of syntactic interpretations.

14. The computer readable program product of claim 13 further comprising:
    reiteration program code for returning to said first inductive merging program code and said second inductive merging program code until said first and second inductive merging program code can make no further reductions in the syntactic interpretations.

15. The computer program product of claim 14 further comprising deductive token merging code for reducing synactic possibilities after completing execution of said reiteration program code.

16. The computer program product of claim 13 wherein said tokenizing program code comprises code that looks up a word in a dictionary, identifies the syntactic identifiers associated with the word and provides a syntactic identifier from a given set of syntactic identifiers for any syntactic identifier that is not in the given set of syntactic identifiers and is in a subclass of the substitute syntactic identifier.

17. The computer program product of claim 13 further comprising multiword matching program code.

18. The computer program product of claim 13 wherein said first inductive merging program code in conjunction with the first set of rules identifies phrase structures in the sentence.

19. The computer program product of claim 13 wherein said second inductive merging program code identifies in conjunction with the second set of rules identifies clause structures in the sentence.

20. A sentence parser comprising:
- a tokenization module that receives a sentence comprised of a string of words and generates syntactic possibilities for the words of the sentence;
- a replaceable set of first substitution and concatenation rules;
- a replaceable set of second substitution and concatenation rules specific to a collection of tokens; and
- an iterative inductive processor for receiving sentences that have been processed by said tokenization module and matching said sentences first against the replaceable set of first substitution and concatenation rules and then against the replaceable set of second substitution and concatenation rules and reiterating said matching to reduce the syntactic possibilities for a sentence.

21. The sentence parser of claim 20 further comprising a multiword comparator.

22. The sentence parser of claim 20 further comprising a deductive processor arranged to operate on the syntactic possibilities remaining from said iterative inductive processor so as to further reduce the syntactic possibilities for the sentence.

23. The sentence parser of claim 20 wherein said tokenization module generates syntactic possibilities by looking up each word in a dictionary, identifying the syntactic identifiers associated with each word and providing a syntactic identifier from a given set of syntactic identifiers for any syntactic identifier that is not in the given set of syntactic identifiers and is in a subclass of the substitute syntactic identifier.

* * * * *